United States Patent [19]

Serres et al.

[11] Patent Number: 4,473,482

[45] Date of Patent: Sep. 25, 1984

[54] ETHYLENE/PROPYLENE/CO POLYMERS

[75] Inventors: Carl Serres, Naperville; John G. Schaffhausen, Aurora, both of Ill.

[73] Assignee: Standard Oil Company (Indiana), Chicago, Ill.

[21] Appl. No.: 447,445

[22] Filed: Dec. 6, 1982

[51] Int. Cl.$^3$ .............................................. C10M 1/28
[52] U.S. Cl. ................................... 252/52 R; 526/230; 526/230.5
[58] Field of Search ............ 252/52 R; 526/230, 230.5

[56]  References Cited

U.S. PATENT DOCUMENTS

| | | | |
|---|---|---|---|
| 3,449,251 | 6/1969 | Lunkel et al. | 252/52 R |
| 3,591,502 | 7/1971 | Hnyckyj et al. | 252/52 R |
| 3,948,873 | 4/1976 | Hudgen et al. | 526/230.5 |
| 4,024,326 | 5/1977 | Hudgen | 526/230 |

FOREIGN PATENT DOCUMENTS 925130  5/1963  United Kingdom .

OTHER PUBLICATIONS

Encyclopedia of Polymer Science and Technology 1968 pp. 397–402.

*Primary Examiner*—Jacqueline V. Howard
*Attorney, Agent, or Firm*—William H. Magidson; William T. McClain

[57]  ABSTRACT

An amorphous, oil soluble ethylene/propylene/CO polymer having a mole ratio of ethylene to propylene from about 35:65 to 60:40 and lube oil compositions comprising said polymers.

18 Claims, No Drawings

ETHYLENE/PROPYLENE/CO POLYMERS

This invention relates to amorphous, oil soluble ethylene/propylene/CO polymers having a mol ratio of ethylene to propylene from about 35:65 to 60:40 and lube oil compositions comprising said polymers. More particularly, this invention relates to amorphous, oil soluble ethylene/propylene/CO polymers having an inherent viscosity of about 0.6 to 1.3 wherein the mol ratio of ethylene to propylene ranges from about 35:65 to 60:40, and lube oil compositions containing these polymers.

High temperature, high speed engines currently in use in Europe and becoming more common in the U.S. require multigrade oils that prevent hot varnish/lacquer and retain their viscosity after extended operation. (Generally the European Market desires a Bosch Shear Stability Index under 30 while the U.S. Market desires a Bosch Shear Stability Index under 45.) These two properties are not generally found in the same additive. For example, ethylene/propylene and hydrogenated diene polymers can possess high shear stability (Low Shear Stability Index) but offer little protection against deposit formation. Styrene copolymers, polyimides, and polymethacrylates are effective against deposits but are rapidly degraded during engine operation. While ethylene/propylene rubbers are a preferred base for shear stable viscosity index improvers primarily because of low cost and ready availability, ethylene/propylene rubbers require post-processing in order to achieve the desired shear stability. Shear stability of ethylene/propylene rubbers is obtained by mechanical shearing or thermo-oxidative shearing. The former process has the disadvantage that it is costly both in terms of capital investment and low throughput while the latter requires special base stocks and additional processing time. Accordingly, there is a need for shear-stable viscosity index improvers based on ethylene/propylene polymers where no post-processing of the polymer is necessary to achieve the desired high shear stability.

For purposes of this invention, inherent viscosity was measured using 0.4 g/100 ml toluene at 30° C.

The general object of this invention is to provide a new class of shear stable viscosity index improvers. Other objects appear hereinafter.

We have now found that random, amorphous, oil soluble ethylene/propylene/CO polymers having an inherent viscosity (I.V.) of about 0.6 to 1.3, preferably 0.7 to 1.0, are excellent shear stable viscosity index improvers. The inherent viscosity of these polymers is primarily dependent on the CO content of the polymer since the carbon monoxide is a poison for the catalysts used to prepare the polymers. As the CO content increases, the inherent viscosity decreases. For example, a polymer having only 0.4% by weight CO has a 0.2 I.V. If the I.V. is above about 1.3, shear stability is too low and thickening power is high. The polymers of this invention have a mol ratio of ethylene to propylene from about 35:65 to 60:40, i.e., the weight ratio of propylene to ethylene is at least 1. If the weight ratio of ethylene to propylene is above 1, the oil solubility of the polymer is reduced at low temperatures and there is a tendency for the polymer to come out of the lube oil composition. On the other hand, as the concentration of propylene increases to above about 65 mol percent, the shear stability of the polymer decreases. It is essential that the polymers of this invention are random, amorphous and oil soluble. As is well known, ordered crystalline polymers are not oil soluble and cannot function as lube oil additives.

While numerous references disclose ethylene, carbon monoxide polymers and the possibility of using other comonomers in place of or together with ethylene, none of these references disclose nor suggest polymers wherein propylene comprises at least 50% by weight of the ethylene and propylene comonomers. For example, U.S. Pat. Nos. 3,948,873 and 4,024,326 of Hudgin each disclose ethylene/CO polymers which can contain minor amounts by weight of comonomers including propylene. British specification No. 925,130, which is incorporated by reference, discloses imparting improved dyeability to olefin polymers by polymerizing CO with ethylene, propylene etc. using as catalyst an inorganic halide salt of a transition metal and organometallic compound. However, there is no appreciation in these patents that the propylene:ethylene weight ratio should be at least 1 as required in the instant invention.

Briefly, the amorphous, oil soluble ethylene/propylene/CO polymers of this invention can be prepared by polymerizing ethylene, propylene and carbon monoxide using a catalyst system comprising an aluminum alkyl and a vanadium halide or oxyhalide or oxyalkoxide. This catalyst combination assures the formation of an amorphous, random, oil soluble polymer. As is well known free radical catalysts are not suitable for polymerizing propylene to a high molecular weight polymer.

As indicated above, the mol ratio of ethylene to propylene ranges from about 35:65 to 60:40. In order to obtain a polymer having an inherent viscosity of about 0.6 to 1.3, preferably 0.7 to 1.0, the ethylene/propylene are copolymerized with approximately 0.02 to 0.2 parts by weight carbon monoxide per 100 parts by weight ethylene/propylene. Approximately half of the carbon monoxide appears to react with the catalyst and poison same and approximately half is incorporated into the ethylene/propylene copolymer. In other words, the resultant ethylene/propylene/CO copolymer typically contains from about 0.01 to 0.1 parts by weight carbonyl groups per 100 parts by weight of ethylene/propylene.

If desired up to 20 mole percent of other copolymerizable monomers per total moles of ethylene and propylene can be used. Suitable other comonomers, including monolefins containing from 4 to 20 carbon atoms, such as 1-butene, 1-hexene, 4-methyl-1-pentene, 1-decene; monovinyl aromatics, such as styrene; diolefins containing from about 4 to about 25 carbon atoms, such as 1,3-butadiene, 1,4-hexadiene, 1,4-pentadiene, 2-methyl-1,5-hexadiene, 1,7-octadiene, 4-methylene-2-norbornene, norbornadiene, etc.; vinyl alkyl ketones containing from 1 to 8 carbon atoms in the alkyl groups, such as methyl vinyl ketone, ethyl vinyl ketone, octyl vinyl ketone, etc. While some of the carbonyl functionality in the polymer provided by carbon monoxide can be supplemented advantageously by the use of alkyl vinyl ketone, it must be recognized that alkyl vinyl ketones are also poisons for the so-called Ziegler catalysts. Therefore, only relatively small concentrations of the vinyl alkyl ketone can be used (e.g. about 0.1 to 15 parts by weight alkyl vinyl ketone per each 100 parts by weight ethylene and propylene in the polymer). In this way the total concentration of carbonyl groups in the polymer can reach about 0.2 parts by weight per each 100 parts by weight ethylene/propylene.

The monomers can be polymerized under conventional conditions, such as slurry, mass or vapor phase, as is common in the olefin polymerization arts.

Polymerization readily occurs at temperatures ranging from about 10° C. to 200° C. as is common in the olefin polymerization art.

After the polymerization reaction is complete, the catalyst composition can be inactivated by the addition thereto of a suitable quenching agent as for example, water or an alcohol such as isopropanol. The polymer formed by the reaction can then be separated from the reaction mixture by conventional procedures well known in the art. Catalyst residues can be removed from the polymer by washing with suitable solvents, such as, for example, water, or an alcohol such as isopropanol. Removal of catalyst residues in some cases is facilitated by diluting the polymerizate with tetrahydrofuran or tetrahydrofuran and ashless wood pulp before washing.

The substantially metal free amorphous, ethylene/propylene/CO polymers of the present invention are effective shear stable, viscosity index improving additives in lubricant compositions when used in amounts from about 0.1 to about 10 percent neat polymer.

Suitable lubricating base oils are minerals oils, petroleum oils, synthetic lubricating oils such as those obtained by the polymerization of hydrocarbons, and other well known synthetic lubricating oils, and lubricating oils of animal or vegetable origin. Concentrates (major proportion base oil and minor proportion additive of this invention) of a suitable oil base containing more than 10 percent, that is of about 10 wt.% alone or in combination with other well known additives, can be used for blending with the lubricant oils in proportions desired for particular conditions or used to give finished products containing from about 0.1 to about 10% of additives of this invention.

While this invention is primarily directed to amorphous, oil soluble/ethylene/propylene/CO polymers having an inherent viscosity of about 0.6 to 1.3, amorphous, oil soluble ethylene/propylene/CO polymers having an I.V. of from about 0.1 to 2 can be used advantageously in lube oil compositions. For example, additives having an I.V. of from about 0.1 to about 0.6 can be used as flow improvers whereas those having an I.V. of from 1.3 to 2.0 can be used in those cases where high shear stability is not required and in some cases where, in fact, low shear stability is preferred. Polymers having an I.V. of from about 0.1 to about 0.4 differ from conventionally used ethylene/propylene rubber, in the sense that it is possible to prepare concentrates of the low inherent viscosity polymers with other lube oil additives without separation of copolymers. Lower I.V. polymers (e.g. 0.4 to 1.3 inherent viscosity) are preferred for the preparation of the dispersant, viscosity index improvers referred to below.

Any of the polymers described in this invention can be converted to highly dispersant, viscosity index improvers by reacting the amorphous, oil soluble ethylene/propylene/CO polymer under Mannich condensation conditions with a formaldehyde yielding reagent and amine. These products are the subject of our Ser. No. 447,446 filed on even date and is hereby incorporated by reference.

EXAMPLE I

Gaseous ethylene and propylene were each added at a rate of 18 liters per hour to a 2 liter resin kettle containing 1 liter of hexane at about 25° C. Separate streams of 17.5 grams of ethyl aluminum dichloride in 130 ml hexane and 1.5 ml of vanadium oxide tributoxide in 150 ml of hexane were added continuously to the reaction solution dropwise. Polymerization started immediately and carbon monoxide was added below the surface of the hexane layer at a rate of 2 ml per minute. The rate of catalyst addition was adjusted so that there was essentially no unreacted olefin off-gas. All of the carbon monoxide addition was completed in 2½ hours while the polymerization temperature was maintained at 25° to 30° C. by external cooling.

The polymer was recovered by adding the polymerizate to 5 liters of methanol containing 60 ml of concentrated hydrochloric acid resulting in the precipitation of 145 grams of crude ethylene/propylene/carbon monoxide polymer. One hundred and twenty-eight grams of the polymer was dissolved in 2.8 liters of toluene, filtered, the filtrate was poured into 14 liters of methanol and the polymer recovered by decantation. After drying overnight in a vacuum oven at 50° C., 110 grams of polymer was recovered having an inherent viscosity of 0.88 (0.4 grams/100 ml in toluene at 30° C.). A 10.4% by weight solution of the polymer in 5 weight base oil gave a clear solution having a viscosity of 1969 Saybolt Universal Seconds at 100° C.

EXAMPLE II

This Example illustrates the production of an ethylene/propylene/carbon monoxide/methyl vinyl ketone polymer. Example I was repeated except that 25 ml of a 50% by weight solution of ethyl aluminum dichloride in hexane and 1.0 ml of vanadium oxide tributoxide in 100 ml of hexane were added as catalysts, and 2.0 ml of methyl vinyl ketone in 500 ml of hexane was added dropwise. After 2.5 hours the polymerizate was poured into 6.8 liters of methanol containing 60 ml of hydrochloric acid. The crude polymer (125 grams) was dissolved in 2.5 liters of toluene, followed by re-precipitation and filtration described in Example I yielding 95 grams having an inherent viscosity of 1.01. At 10.3% by weight solution of the polymer in 5 weight base oil gave a clear solution having a viscosity of 2,493 Saybolt Universal Seconds at 100° C.

EXAMPLE III

This Example illustrates the shear stability of the viscosity index polymers of Examples I and II. In general, it is preferred that the Bosch shear stability index should be no more than about 30.

TABLE I

| Polymer | Ex. #1 | Ex. #2 |
|---|---|---|
| Bosch SSI | 28.4 | 24.7 |
| % Rubber in Additive | 10.4 | 10.3 |
| Min. Vis. for 10W40 Bosch SIG (cs) | 14.45 | 14.03 |
| % Additive for Above Vis. | 16.37 | 14.12 |
| % Rubber in Oil At Above Treat | 1.70 | 1.45 |

The above data clearly shows that the polymers of this invention are effective shear stable viscosity index improvers.

We claim:
1. An amorphous, oil soluble ethylene/propylene/CO polymer having a mol ratio of ethylene to propylene from about 35:65 to 60:40 and said polymer contains from about 0.01 to 0.2 parts by weight carbonyl groups provided by CO per 100 parts by weight of ethylene and propylene.

2. The polymer of claim 1 wherein said polymer has an inherent viscosity of 0.1 to about 2.0.

3. The polymer of claim 2 wherein said polymer contains from about 0.01 to 0.2 parts by weight carbonyl groups per 100 parts by weight of ethylene and propylene.

4. The polymer of claim 3 wherein part of the carbonyl groups are provided by a vinyl alkyl ketone.

5. The polymer of claim 3 wherien all of said carbonyl groups are provided by carbon monoxide and the total concentration of carbonyl groups is from about 0.01 to 0.1 parts by weight for each 100 parts by weight of ethylene and propylene.

6. The polymer of claim 1 wherein said polymer has an inherent viscosity of from about 0.6 to 1.3.

7. The polymer of claim 6 wherein said polymer contains from about 0.01 to 0.2 parts by weight carbonyl groups per 100 parts by weight of ethylene and propylene.

8. The polymer of claim 7 wherein part of the carbonyl groups in said polymer are provided by a vinyl alkyl ketone.

9. The polymer of claim 7 wherein all of the carbonyl groups are provided by carbon monoxide and the total concentration of carbonyl groups ranges from about 0.01 to about 0.1 parts by weight per 100 parts by weight of ethylene and propylene.

10. A lube oil composition comprising a major portion of lubricating base oil and a minor portion of the polymer of claim 1.

11. A lube oil composition comprising a major portion of lubricating base oil and a minor portion of the polymer of claim 2.

12. A lube oil composition comprising a major portion of lubricating base oil and a minor portion of the polymer of claim 3.

13. A lube oil composition comprising a major portion of lubricating base oil and a minor portion of the polymer of claim 4.

14. A lube oil composition comprising a major portion of lubricating base oil and a minor portion of the polymer of claim 5.

15. A lube oil composition comprising a major portion of lubricating base oil and a minor portion of the polymer of claim 6.

16. A lube oil composition comprising a major portion of lubricating base oil and a minor portion of the polymer of claim 7.

17. A lube oil composition comprising a major portion of lubricating base oil and a minor portion of the polymer of claim 8.

18. A lube oil composition comprising a major portion of lubricating base oil and a minor portion of the polymer of claim 9.

* * * * *